US009840239B2

(12) United States Patent
Meier

(10) Patent No.: US 9,840,239 B2
(45) Date of Patent: Dec. 12, 2017

(54) CORNERING BRAKE CONTROL

(71) Applicant: Robert Bosch GmbH, Stuttgart (DE)

(72) Inventor: Michael R. Meier, Walled Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 14/881,573

(22) Filed: Oct. 13, 2015

(65) Prior Publication Data

US 2017/0101081 A1   Apr. 13, 2017

(51) Int. Cl.
    *B60T 8/17* (2006.01)
    *B60T 8/24* (2006.01)
    *B60T 8/171* (2006.01)

(52) U.S. Cl.
    CPC ............ *B60T 8/1706* (2013.01); *B60T 8/171* (2013.01); *B60T 8/241* (2013.01)

(58) Field of Classification Search
    CPC ......... B60T 8/1706; B60T 8/171; B60T 8/241
    See application file for complete search history.

(56) References Cited

U.S. PATENT DOCUMENTS

| 4,989,922 | A | * | 2/1991 | Pickenhahn | .......... B60T 8/1706 |
| | | | | | 180/219 |
| 5,411,325 | A | * | 5/1995 | Tanaka | .................. B60T 8/1706 |
| | | | | | 303/150 |
| 7,006,901 | B2 | | 2/2006 | Wang | |
| 8,565,979 | B2 | | 10/2013 | Linker et al. | |

(Continued)

FOREIGN PATENT DOCUMENTS

| DE | 102008021523 | 12/2008 |
| EP | 2810836 | 12/2014 |
| WO | 2006136515 | 12/2006 |

OTHER PUBLICATIONS

Boniolo et al., "Lean angle estimation in two-wheeled vehicles with a reduced sensor configuration," 2012 IEEE International Symposium on Circuits and Systems (ISCAS), May 20-23, 2012, pp. 2573-2576.

(Continued)

*Primary Examiner* — Thomas G Black
*Assistant Examiner* — Sze-Hon Kong
(74) *Attorney, Agent, or Firm* — Michael Best & Friedrich LLP

(57) ABSTRACT

A method and system for determining a maximum cornering braking threshold for a motorcycle includes determining an absolute lean angle with respect to horizontal and a relative lean angle for the motorcycle relative to a road surface. The maximum cornering braking threshold is determined from at least the absolute lean angle and the relative lean angle. The maximum cornering braking threshold is used to provide stability during motorcycle cornering. A multi-dimensional look-up table stores different maximum cornering braking thresholds that correspond to different combinations of absolute lean angles and relative lean angles. The relative lean angle is determined by processing video data from a video sensor. Values for additional conditions, such as motorcycle speed, wheel slip coefficient, steering angle, mue and type of road way are stored in the multi-dimensional look-up table to assist in determining the maximum cornering braking threshold.

15 Claims, 4 Drawing Sheets

(56) References Cited

U.S. PATENT DOCUMENTS

| | | | |
|---|---|---|---|
| 9,580,009 B1* | 2/2017 | Lenker | B60Q 1/2603 |
| 2002/0039951 A1* | 4/2002 | Hasegawa | B60R 21/0132 |
| | | | 477/183 |
| 2005/0127240 A1 | 6/2005 | Culp | |
| 2009/0024350 A1* | 1/2009 | Suzuki | G01C 9/00 |
| | | | 702/141 |
| 2010/0168966 A1* | 7/2010 | Tsujii | B60Q 1/12 |
| | | | 701/48 |
| 2011/0118941 A1* | 5/2011 | Linker | B62J 27/00 |
| | | | 701/42 |
| 2013/0238206 A1 | 9/2013 | Lemejda | |
| 2013/0282253 A1 | 10/2013 | Ono et al. | |
| 2014/0212003 A1* | 7/2014 | Ono | G01P 3/806 |
| | | | 382/107 |
| 2015/0057904 A1* | 2/2015 | Nishimura | B60T 8/1706 |
| | | | 701/70 |
| 2015/0127240 A1* | 5/2015 | Nozawa | B60K 28/02 |
| | | | 701/82 |
| 2015/0183480 A1* | 7/2015 | Ono | B62J 27/00 |
| | | | 701/72 |
| 2016/0061132 A1* | 3/2016 | Hieda | B60K 31/0083 |
| | | | 701/110 |
| 2017/0089939 A1* | 3/2017 | Azuma | G01P 3/44 |

OTHER PUBLICATIONS

Gasbarro et al., "Motorcycle Trajectory Reconstruction by Integration of Vision and MEMS Accelerometers," 43rd IEEE Conference on Decision and Control, Dec. 14-17, 2004, pp. 779-783.

Tibu, "How Motorcycle ABS Works," Auto Revolution, Aug. 2, 2013, 7 pages <URL: http://www.autoevolution.com/news/how-motorcycle-abs-works-64330.html>.

* cited by examiner

CORNERING BRAKE CONTROL

BACKGROUND

The present invention relates to a method and system to obtain a maximum cornering braking threshold for a motorcycle that is turning or cornering. The invention prevents the motorcycle from exceeding the maximum cornering braking threshold.

SUMMARY

In one embodiment, the invention is directed towards a system for providing braking control for high-performance motorcycles. The system defines a maximum cornering braking threshold or force based on the current "lean" angle of the motorcycle (the further the motorcycle is leaned to one side, the less braking force can be properly applied). The system includes a video sensor (e.g., a camera) that is used to determine the relative lean angle of the motorcycle relative to the road surface. In some constructions, the system also determines an absolute lean angle of the motorcycle relative to true horizontal and the maximum braking force is determined based in part on the relative lean angle (i.e., angle between motorcycle and road surface) and the absolute lean angle (i.e., angle between motorcycle and true horizontal). Once determined, these lean angles may be used by the system to control other factors associated with the braking system (brake distribution between front and rear wheel, anti-lock brake system (ABS), etc.). Further, additional conditions, such as wheel slip coefficient, motorcycle speed, road way type, and steering angle, may assist in determining a maximum cornering braking threshold or force.

In one embodiment, the invention provides a method for determining a maximum cornering braking threshold for a motorcycle that is cornering by determining an absolute lean angle relative to horizontal; determining a relative lean angle for the motorcycle relative to a road surface; determining the maximum cornering braking threshold based on at least the absolute lean angle and the relative lean angle; and preventing the motorcycle from exceeding the maximum cornering braking threshold during cornering.

In another embodiment, the invention provides a method for determining of the maximum cornering braking threshold including a multi-dimensional look-up table storing at least a plurality of values for absolute lean angles and a plurality of values for relative lean angles, the multi-dimensional look-up table having different maximum cornering braking thresholds based on the value of the absolute lean angle and the relative lean angle.

In another embodiment, the method includes sensing front wheel speed; sensing rear wheel speed; and determining a motorcycle speed and a wheel slip coefficient from the front wheel speed and the rear wheel speed. Further, the determining of the maximum cornering braking threshold with the multi-dimensional look-up table for at least the absolute lean angle and the relative lean angle, includes values for motorcycle speed and values for the wheel slip coefficient.

In another embodiment, the method includes obtaining a difference between the absolute lean angle and the relative lean angle to determine the maximum cornering braking threshold.

In another embodiment, the determining of the relative lean angle for the motorcycle relative to the road surface includes processing video data from a camera mounted on the motorcycle. In one embodiment, the determining of the absolute lean angle for the motorcycle relative to horizontal includes a tilt sensor mounted on the motorcycle.

In another embodiment, the determining of the maximum cornering braking threshold includes a multi-dimensional look-up table of values for at least absolute lean angles and relative lean angles, and the preventing of the motorcycle from exceeding the maximum cornering braking threshold during cornering includes controlling a brake distribution between a front wheel and a rear wheel of the motorcycle.

In another embodiment, the method includes determining mue from video data from a video sensor mounted on the motorcycle, and determining a type of road way from the video data, and the determining of the maximum cornering braking threshold from at least the absolute lean angle and the relative lean angle further includes the mue and the type of road way.

In one embodiment, the invention provides a system for determining a maximum cornering braking threshold for a motorcycle that is cornering comprising: an absolute lean angle sensor for sensing an absolute lean angle relative to horizontal for the motorcycle; a video sensor secured to the motorcycle for providing video data; and a processor configured to: process the video data to determine a relative lean angle for the motorcycle relative to a road surface; determine the maximum cornering braking threshold from at least the absolute lean angle and the relative lean angle with a multi-dimensional look-up table storing a plurality of values for absolute lean angles and storing a plurality of values for relative lean angles; and control at least a brake control system to prevent the motorcycle from exceeding the maximum cornering braking threshold during motorcycle cornering.

In another embodiment, the multi-dimensional look-up table includes a plurality of values for the maximum cornering braking threshold based on the absolute lean angle and the relative lean angle, and the relative lean angle for the motorcycle differs from the absolute lean angle in a banked curve of a road way.

In another embodiment, the system includes a front wheel speed sensor and a rear wheel speed sensor, wherein the processor is configured to determine a wheel slip coefficient from wheel speed signals, the multi-dimensional look-up table includes values for the wheel slip coefficient, and the maximum cornering braking threshold is based upon the absolute lean angle, the relative lean angle, and the wheel slip coefficient.

In another embodiment, the processor is configured to determine a coefficient of friction of a road surface and a type of road way from the video data, and the maximum cornering braking threshold is based upon the absolute lean angle, the relative lean angle, the wheel slip coefficient, the coefficient of friction and the type of road way.

In another embodiment, the system includes a steering angle sensor for sensing a steering angle of the motorcycle, and the maximum cornering braking threshold is based upon the absolute lean angle, the relative lean angle, the wheel slip coefficient, the coefficient of friction, the type of road way and the steering angle.

In another embodiment, control of the brake control system to prevent the motorcycle from exceeding the maximum cornering braking threshold during the motorcycle cornering includes controlling brake distribution between a front wheel and a rear wheel of the motorcycle.

In another embodiment, control of the brake control system to prevent the motorcycle from exceeding the maximum cornering braking threshold during cornering includes controlling an anti-lock brake system of the brake control system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
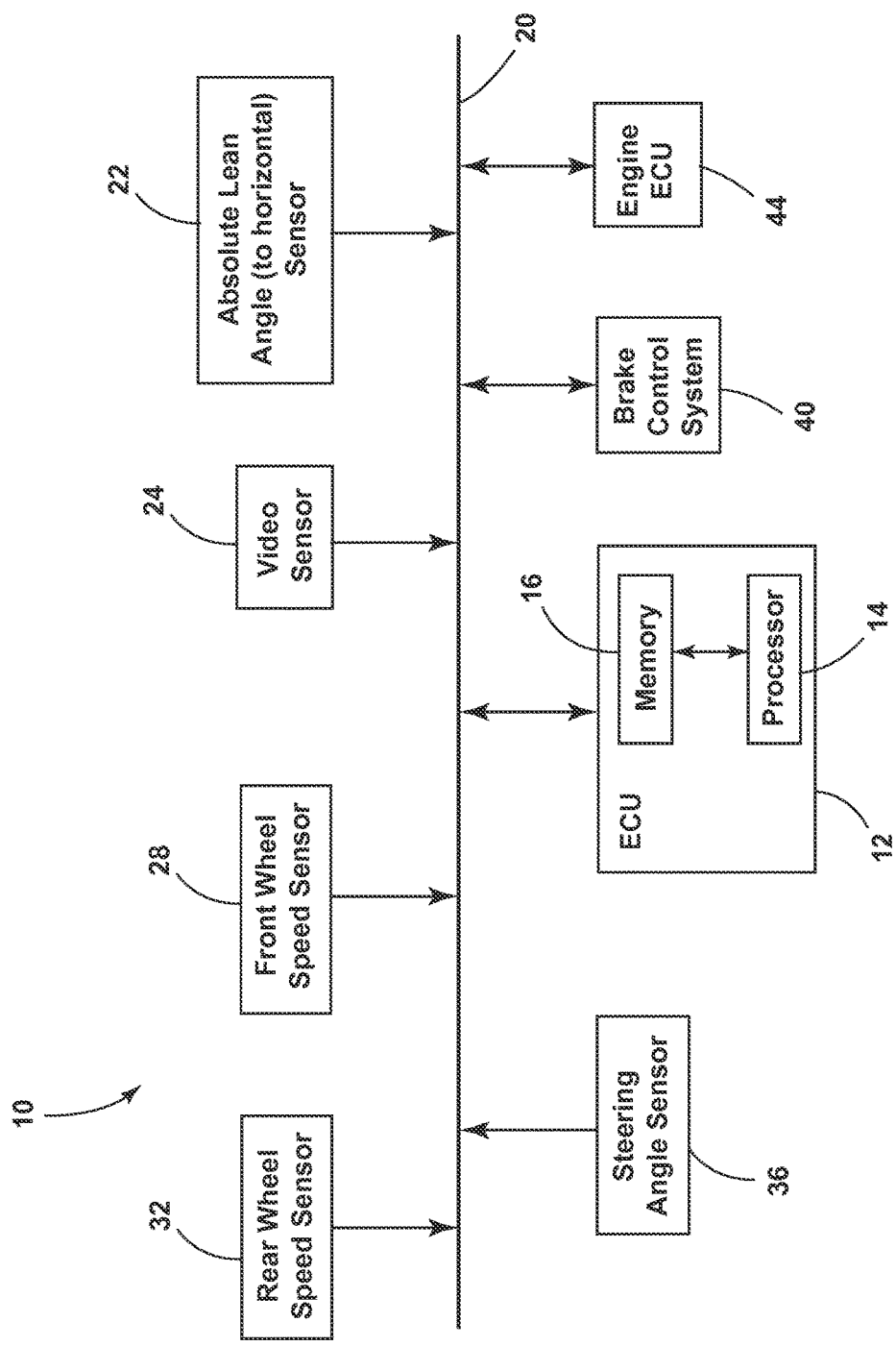
FIG. 1 is a block diagram of a motorcycle control system.

FIG. 1 shows a vehicle control system 10 for a vehicle that acts as a motorcycle stability control system and/or as a motorcycle traction control system. The vehicle control system 10 includes an electronic control unit, and more specifically in some embodiments a motorcycle stability control electronic control unit (ECU) 12. The ECU 12 includes a processor 14 and a memory 16. In one embodiment, the memory 16 stores programs and algorithms that are executable by the processor 14. A communication bus, such as a controller area network (CAN) bus 20, provides communication between the ECU 12 and other devices discussed below. Other communication buses, including a FlexRay bus and an Ethernet, are contemplated.

The system 10 of FIG. 1 includes an absolute lean angle sensor 22 for determining an absolute lean angle of a motorcycle relative to horizontal. Horizontal is defined relative to gravity and not a slope of a road way. Thus, the absolute lean angle sensor 22 is an inertial sensor, such as an accelerometer, a pendulum or other type of angle sensor that senses an absolute lean angle of a motorcycle relative to horizontal. In some embodiments, the absolute lean angle sensor 22 is a tilt sensor that provides the absolute lean angle that is transverse to the direction of travel of the motorcycle. In some embodiments, the lean angle sensor 22 provides acceleration values for each of the x-axis, y-axis and z-axis to determine the orientation of the motorcycle, including whether the motorcycle is going uphill or downhill, along with a banked curve. The absolute lean angle sensor 22 provides the measured or otherwise determined absolute lean angle value to the ECU 12 via the CAN bus 20.

The system of FIG. 1 also includes a video sensor 24 that obtains video data in a forward direction. The video data includes a video stream and a sequence of images that include the road way. Various types of video cameras that are secured or fixedly mounted to a frame or other portion of a motorcycle are contemplated for the video sensor 24. The video sensor 24 provides video data to the ECU 12 for processing via the CAN bus 20.

FIG. 1 shows a front wheel speed sensor 28 and a rear wheel speed sensor 32. The known wheel speed sensors measure respective wheel speeds and provide wheel speed signals to the ECU 12 via the CAN bus 20.

Steering angle sensor 36 is shown in FIG. 1 for sensing turning of the front wheel of the motorcycle. The steering angle sensor 36 provides the steering angle to the ECU 12 via the CAN bus 20.

Brake control system 40 shown in FIG. 1 includes an electronic control unit, processor and memory. The brake control system 40 controls actuation of vehicle brakes in response to control of a brake actuator by a vehicle operator. The brake control system 40 includes an anti-lock brake system (ABS) system in some embodiments.

An engine electronic control unit (ECU) 44 shown in FIG. 1 provides control of a vehicle engine in response to use of a throttle by a vehicle operator. In some instances, the vehicle engine is controlled or limited by signals from the ECU 12 and/or a traction control ECU.

Figure 2:
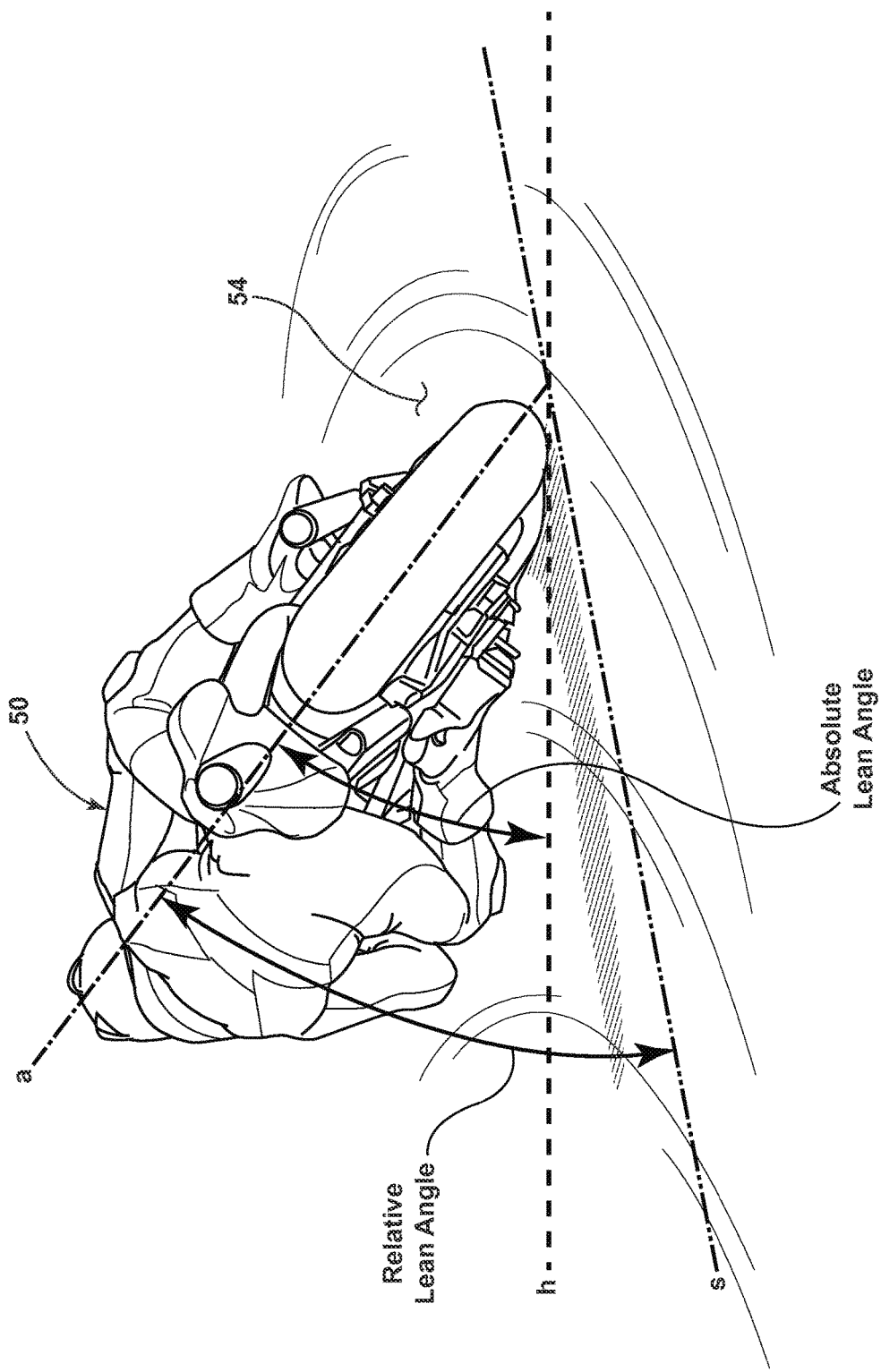
FIG. 2 is a perspective view of a motorcycle cornering at a given lean angle.

FIG. 2 shows a motorcycle 50 turning on a banked curve of a road surface 54. The banked curve allows a greater motorcycle speed during the turn. The tilt or lean of the motorcycle 50 is represented by line a. A horizontal direction relative to gravity is represented by line h in FIG. 3. The slope of the road surface 54 of the banked curve is represented by line s. The absolute lean angle of the motorcycle 50 is measured horizontally to gravity despite the banked curve of the road surface 54. Thus, the absolute lean angle is defined by the angle formed between line a and line h. The relative lean angle of the motorcycle 50 is determined by the angle formed between line a and line s, which corresponds to the slope of the road surface 54.

When turning, the braking pressure applied to the front wheel of a motorcycle can affect the steering of the vehicle. Similarly, braking pressure applied to the front and rear wheels of the motorcycle can affect stability. As such, the maximum braking force that can be safely applied to the front and rear wheels of the motorcycle are affected by variables including, for each, the angle of the motorcycle and the coefficient of friction of the road surface.

Figure 3:
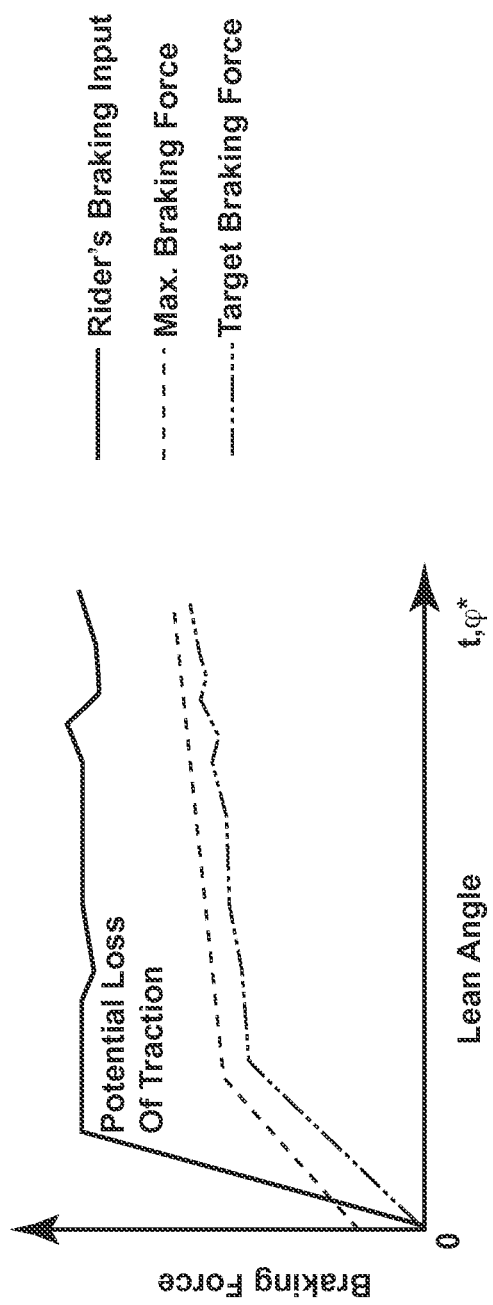
FIG. 3 is a graph of braking force potential versus lean angle for a cornering motorcycle.

FIG. 3 illustrates an example of the relationship between safe braking force and lean angle for the motorcycle 50. In particular, FIG. 3 shows a maximum safe braking force at each lean angle for the motorcycle. When the lean angle (e.g., the angle between the motorcycle and the road surface or the horizon) is large, a relatively large amount of braking force can safely be applied to the wheels. However, when the lean angle is small, the maximum safe braking force is also relatively small.

To improve safe handling of the motorcycle, some implementations described herein limit the amount of braking force that is applied so that the braking force is below a determined maximum safe braking threshold. Therefore, as also illustrated in FIG. 3, when a rider inputs a braking input (the solid line in FIG. 3), the system augments the target braking pressure that is applied by the braking system to values below the maximum braking force threshold for a given lean angle (as represented by the second dashed line in FIG. 3).

Figure 4:
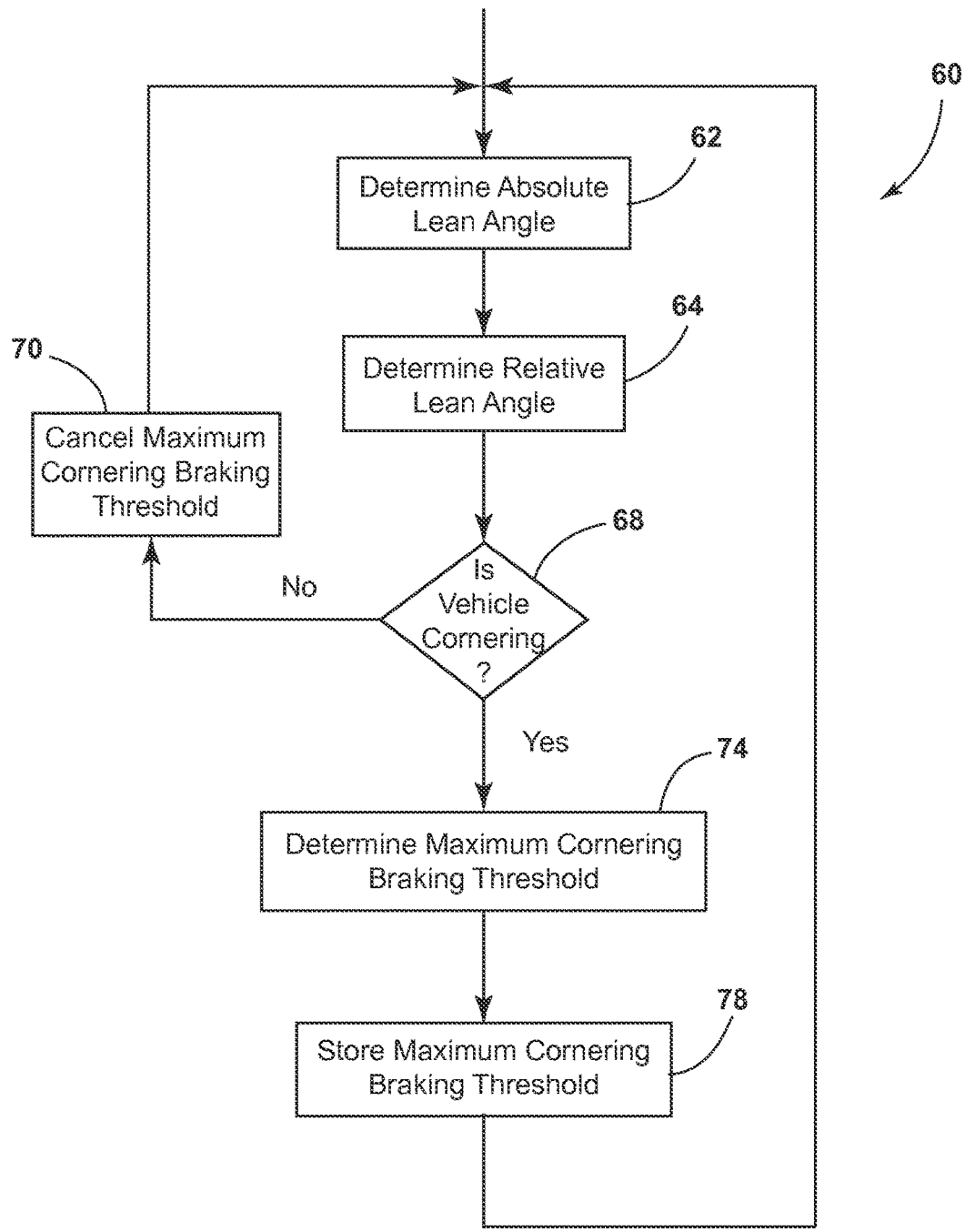
FIG. 4 is a flow chart 60 of the operation of the vehicle control system 10 shown in FIG. 1.

FIG. 4 shows a flow chart 60 illustrating a method of the operation of the vehicle control system 10 that augments or controls the braking force applied to a vehicle based on both the absolute lean angle of the motorcycle and the lean angle relative to the road surface. At a first step 62, an absolute lean angle is provided to the processor 14 of the ECU 12 by the absolute lean angle sensor 22. The program of the processor 14 then advances to step 64.

At step 64, the processor 14 determines a relative lean angle. In one embodiment, the relative lean angle is determined from video data from the video sensor 24. The road surface is viewed and frontwardly the horizon is utilized to assist in determining the amount of lean over of the motorcycle 50 and the shape or angle of the road surface 54 of a road way. In this way, the amount of relative lean of the motorcycle 50 relative to the actual road surface is determined. In one embodiment, a sequence of images are compared to determine the road surface, especially relative to horizontal to determine the slope of a banked curve. In some embodiments, the processor 14 is configured for processing additional information that assists in determining the relative lean angle. Such information includes whether the motorcycle 50 is proceeding uphill or downhill in one embodiment. When the relative lean angle is greater than the absolute lean angle, the motorcycle 50 is turning in a banked curve. Thereafter, the processor 14 advances to step 68.

At step 68 shown in FIG. 4, the processor 14 determines from at least one of the absolute lean angle and the relative lean angle whether the motorcycle 50 is cornering. When the motorcycle 50 is not cornering, the processor 14 advances to step 70.

At step 70, the stored maximum cornering brake threshold is cleared, as the motorcycle 50 is no longer cornering. Thereafter, the processor 14 returns to step 62 to restart the determination of vehicle cornering by obtaining an absolute lean angle.

At step 68, when the motorcycle 50 is determining to be cornering from at least one of the absolute lean angle and the relative lean angle, the processor 14 advances to step 74. At step 74, a maximum cornering braking threshold is determined based upon at least the absolute lean angle and the relative lean angle. When the relative lean angle is greater than the absolute lean angle, the motorcycle 50 is being turned in a banked curve of a road surface 54 of a road way. In embodiments discussed below, additional factors or sensed information are also utilized to determine cornering. Thereafter, the processor 14 advances to step 78.

At step 78 in FIG. 4, the maximum cornering braking threshold is stored by the processor 14 in memory 16 or elsewhere. Thereafter, the processor 14 return to step 62 to determine the absolute lean angle for the motorcycle 50 and repeat the preceding steps.

In motorcycle operation based on the maximum cornering braking threshold, the processor 14 and the ECU 12 control the brake control system 40, and in some instances the engine ECU 44, to prevent the operator from applying braking force to the motorcycle 50 beyond the particular maximum cornering braking threshold for the determined lean angles. In one embodiment, the ECU 12 provides the maximum cornering braking threshold to the brake control system 40 to, when necessary, override a braking force that the motorcycle operator applies to the front and/or rear wheel of the motorcycle 50. In this way, potential loss of traction of a motorcycle 50 due to over braking of a cornering motorcycle is minimized. At the same time, in some embodiments the ECU 12 is capable of signaling the engine ECU 44 through the CAN bus 20 to also provide an amount of engine braking to the motorcycle 50.

In one embodiment, values for the absolute lean angle and the relative lean angle are stored in and obtained from a multi-dimensional look-up table having at least a plurality of values for absolute lean angles and a plurality of values for relative lean angles. The multi-dimensional look-up table has different maximum cornering braking thresholds based on the values of the absolute lean angle and the relative lean angle. In one embodiment, the multi-dimensional look-up table of values is stored in memory 16.

In one embodiment, the coefficient of friction or mue is determined by processing video data from the video sensor. Images of the road surface that are compared with video data or images stored in memory 16 of the ECU 12 or another memory accessible via the CAN bus 20. The images of the road surface 54 are obtained by the video sensor 24 and processed by the processor 14 of the ECU 12. From properties of the images, the coefficient of friction of the road way is determined.

Thus, in an embodiment incorporating the mue, the maximum cornering braking threshold of the motorcycle 50 is determined from at least the absolute lean angle, the relative lean angle, and the mue. Values for the absolute lean angle, the relative lean angle and the mue are looked up in a multi-dimensional look-up table storing at least a plurality of values for absolute lean angles, a plurality of values for relative lean angles, and a plurality of values for mue. The multi-dimensional look-up table stores different maximum cornering braking thresholds based on the individual values of the absolute lean angle, the relative lean angle and the mue.

In another embodiment, the processor 14 processes the video data of the road surface to determine a type of road way. Different types of road ways are stored in the multi-dimensional look-up table, as well as some or all of the values discussed above. The multi-dimensional look-up table has different maximum cornering braking thresholds that depend on the type of road way, along with the absolute lean angle, the relative lean angle and the mue as set forth above.

Other embodiments include a wheel slip coefficient determined by the processor 14 from the front wheel speed sensed by the front wheel speed sensor 28 and the rear wheel speed sensed by the rear wheel speed sensor. Further, the motorcycle speed is determinable from the wheel speed sensors or from another separate sensor. The multi-dimensional look-up table has a plurality of values for the wheel slip coefficient and the motorcycle speed, as well as some or all of the values discussed above as being stored therewith. Thus, the additional wheel slip coefficient and the motorcycle speed are additionally used to determine the maximum cornering braking threshold for the motorcycle 50.

In another embodiment, the steering angle is provided to the processor 14 by the steering angle sensor 36 via the CAN bus 20. The multi-dimensional look-up table includes a plurality of values for the steering angle. The steering angle, along with some or all of the other values discussed above, are utilized in the multi-dimensional look-up table to obtain a maximum cornering braking threshold based on the other above listed angles, coefficients, type of road way and motorcycle speed.

Another embodiment includes obtaining a difference between the absolute lean angle and the relative lean angle to determine the maximum cornering braking threshold.

In one embodiment, the ECU 12 controls brake distribution between the front wheel and the rear wheel of the motorcycle 50 to maximize braking, e.g. see FIG. 2. In one embodiment, this brake distribution occurs when the motorcycle operator is applying force to brake only one of the wheels. In this embodiment, the ECU 12 prevents the motorcycle 50 from exceeding the maximum cornering braking threshold and further controls the ABS system of the brake control system.

While determining a maximum cornering braking threshold is detailed herein, in some embodiments the maximum cornering braking threshold corresponds to the target braking force shown in FIG. 3. Thus, a margin is provided before a potential loss of traction occurs. In one embodiment, the maximum cornering braking thresholds provided in the multi-dimensional look-up table account for the difference between the maximum cornering braking force and the target cornering braking force. Therefore, the maximum cornering braking thresholds stored account for the margin above and correspond to the target cornering braking force in one embodiment.

The term "cornering" represents a change of direction of the motorcycle 50 in a forward direction. In some embodiments, a particular minimum absolute lean angle value or minimum relative lean angle value is not required to determine that the motorcycle is cornering. In some embodiments, a plurality of conditions are evaluated to determine cornering of the motorcycle 50.

A motorcycle 50 is contemplated to include other two-wheeled powered vehicles, such as scooters and electric-powered vehicles that are not necessarily typically identified as a motorcycle.

Thus, the invention provides, among other things, a method and system for determining a maximum cornering braking threshold for a motorcycle 50 that is cornering from at least an absolute lean angle relative to horizontal and a relative lean angle that is relative to a road surface 54. Preventing the motorcycle from exceeding the maximum cornering braking threshold during motorcycle cornering results from invention. Various features and advantages of the invention are set forth in the following claims.

What is claimed is:

1. A method for determining a maximum cornering braking threshold for a motorcycle that is cornering, the method comprising:
   determining, with a processor an absolute lean angle relative to horizontal;
   determining a relative lean angle for the motorcycle relative to a road surface;
   storing, a plurality of values for absolute lean angles and a plurality of values for relative lean angles in a multi-dimensional lookup table;
   determining the maximum cornering braking threshold based on at least the absolute lean angle and the relative lean angle in the multi-dimensional look-up table; and
   preventing the motorcycle from exceeding the maximum cornering braking threshold during cornering.

2. The method according to claim 1, including
   sensing front wheel speed;
   sensing rear wheel speed;
   determining a motorcycle speed and a wheel slip coefficient from the front wheel speed and the rear wheel speed; and
   the determining of the maximum cornering braking threshold with the multi-dimensional look-up table for at least the absolute lean angle and the relative lean angle, further includes values for motorcycle speed and values for the wheel slip coefficient.

3. The method according to claim 1, including obtaining a difference between the absolute lean angle and the relative lean angle to determine the maximum cornering braking threshold.

4. The method according to claim 1, the determining of the relative lean angle for the motorcycle relative to the road surface including processing video data from a camera mounted on the motorcycle.

5. The method according to claim 1, the determining of the absolute lean angle for the motorcycle relative to horizontal including a tilt sensor mounted on the motorcycle.

6. The method according to claim 1, the determining of the maximum cornering braking threshold including a multi-dimensional look-up table of values for at least absolute lean angles and relative lean angles, and the preventing of the motorcycle from exceeding the maximum cornering braking threshold during cornering includes controlling a brake distribution between a front wheel and a rear wheel of the motorcycle.

7. The method according to claim 1, including
   determining mue from video data from a video sensor mounted on the motorcycle, and
   determining a type of road way from the video data,
   wherein the determining of the maximum cornering braking threshold from at least the absolute lean angle and the relative lean angle further includes the mue and the type of road way.

8. A system for determining a maximum cornering braking threshold for a motorcycle that is cornering comprising:
   an absolute lean angle sensor for sensing an absolute lean angle relative to horizontal for the motorcycle;
   a video sensor secured to the motorcycle for providing video data; and
   a processor configured to:
     process the video data to determine a relative lean angle for the motorcycle relative to a road surface;
     determine the maximum cornering braking threshold from at least the absolute lean angle and the relative lean angle with a multi-dimensional look-up table storing a plurality of values for absolute lean angles and storing a plurality of values for relative lean angles; and
     control at least a brake control system to prevent the motorcycle from exceeding the maximum cornering braking threshold during motorcycle cornering.

9. The system according to claim 8, wherein the multi-dimensional look-up table includes a plurality of values for the maximum cornering braking threshold based on the absolute lean angle and the relative lean angle, and wherein the relative lean angle for the motorcycle differs from the absolute lean angle in a banked curve of a road way.

10. The system according to claim 9, including:
    a front wheel speed sensor; and
    a rear wheel speed sensor,
    wherein the processor is configured to determine a wheel slip coefficient from wheel speed signals, the multi-dimensional look-up table includes values for the wheel slip coefficient, and the maximum cornering braking threshold is based upon the absolute lean angle, the relative lean angle, and the wheel slip coefficient.

11. The system according to claim 10, wherein the processor is configured to determine a coefficient of friction of a road surface and a type of road way from the video data, and the maximum cornering braking threshold is based upon the absolute lean angle, the relative lean angle, the wheel slip coefficient, the coefficient of friction and the type of road way.

12. The system according to claim 11, including a steering angle sensor for sensing a steering angle of the motorcycle, and wherein the maximum cornering braking threshold is based upon the absolute lean angle, the relative lean angle, the wheel slip coefficient, the coefficient of friction, the type of road way and the steering angle.

13. The system according to claim 8, wherein the processor is configured to:
    obtain a difference between the absolute lean angle and the relative lean angle for the determining of the maximum cornering braking threshold.

14. The system according to claim 8, wherein the control of at least the brake control system to prevent the motorcycle from exceeding the maximum cornering braking threshold during the motorcycle cornering includes controlling brake distribution between a front wheel and a rear wheel of the motorcycle.

15. The system according to claim 14, wherein the control of at least the brake control system to prevent the motorcycle from exceeding the maximum cornering braking threshold during cornering includes controlling an anti-lock brake system of the brake control system.

* * * * *